US008413681B2

(12) United States Patent
Schmuckle

(10) Patent No.: US 8,413,681 B2
(45) Date of Patent: Apr. 9, 2013

(54) SWIVEL ADAPTER FOR AN IRRIGATION VALVE

(75) Inventor: Darrin I. Schmuckle, Vista, CA (US)

(73) Assignee: Hunter Industries, Inc., San Marcos, CA (US)

( * ) Notice: Subject to any disclaimer, the term of this patent is extended or adjusted under 35 U.S.C. 154(b) by 408 days.

(21) Appl. No.: 12/795,952

(22) Filed: Jun. 8, 2010

(65) Prior Publication Data

US 2011/0297757 A1 Dec. 8, 2011

(51) Int. Cl.
*E03B 1/00* (2006.01)
(52) U.S. Cl. ............... 137/614.19; 251/148; 251/30.03
(58) Field of Classification Search .......... 251/148, 251/151, 129.01, 30.03; 137/614, 614.19, 137/315.03, 315.04, 315.11; 285/190, 272, 285/272.1, 273, 280, 281
See application file for complete search history.

(56) References Cited

U.S. PATENT DOCUMENTS

| 1,762,771 | A | * | 6/1930 | Eble | 251/148 |
|---|---|---|---|---|---|
| 2,400,658 | A | * | 5/1946 | Shepherd | 285/190 |
| 2,459,643 | A | * | 1/1949 | Hartley | 285/190 |
| 2,593,848 | A | * | 4/1952 | Clausen | 251/61 |
| 2,732,169 | A | * | 1/1956 | Matteo | 251/148 |
| 2,872,217 | A | * | 2/1959 | May | 285/45 |
| 3,767,053 | A | * | 10/1973 | Bavin | 210/232 |
| 4,672,998 | A | * | 6/1987 | Kozak, III | 137/614.04 |
| 5,372,389 | A | * | 12/1994 | Tam et al. | 285/94 |
| 5,979,482 | A | * | 11/1999 | Scott | 137/15.01 |
| 7,665,713 | B1 | * | 2/2010 | Clark | 251/5 |
| 7,806,382 | B1 | * | 10/2010 | Palumbo et al. | 251/30.03 |

OTHER PUBLICATIONS

Rain Bird PRS-D Pressure Regulator Installation and Operation Guide, 2 pages (published in 2000).

* cited by examiner

*Primary Examiner* — John K Fristoe, Jr.
*Assistant Examiner* — Umashankar Venkatesan
(74) *Attorney, Agent, or Firm* — Michael H. Jester

(57) ABSTRACT

A swivel fitting is specifically configured for mounting a pressure regulator and a solenoid to a valve having a female threaded solenoid mounting port. The swivel fitting includes a generally cylindrical upper body having a first female threaded bore for having a male threaded neck of either a solenoid or a pressure regulator screwed into the first bore. A generally cylindrical lower body is mated to the upper body and has a male threaded segment for screwing into the female threaded solenoid mounting port of a valve. A swivel body surrounds and encloses the upper body and the lower body and has an extension with a second female threaded bore for having the male threaded neck of either the solenoid or the pressure regulator screwed into the same. The swivel body is freely rotatable relative to the cylindrical bodies. A pair of valve seats in the swivel body and communicating ports and chambers allow the solenoid to open and close flow through the valve and the pressure regulator to regulate flow through the valve when the solenoid and the pressure regulator are each screwed into one of the first and second bores.

19 Claims, 8 Drawing Sheets

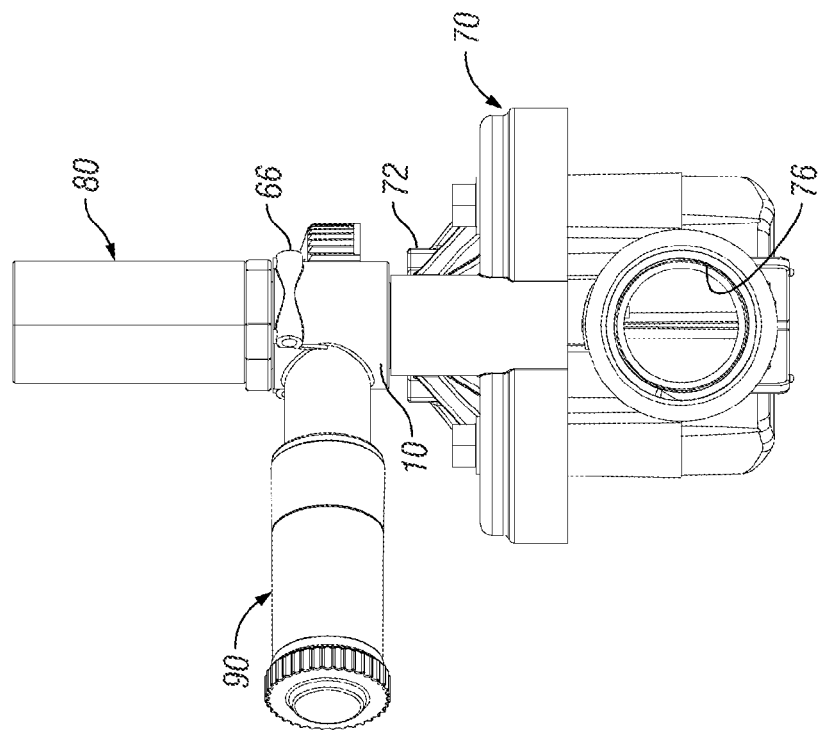
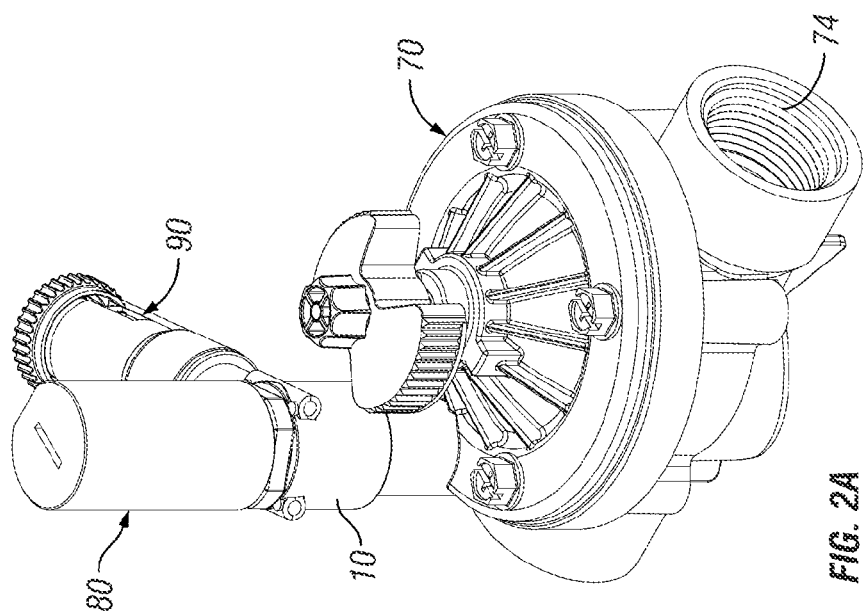

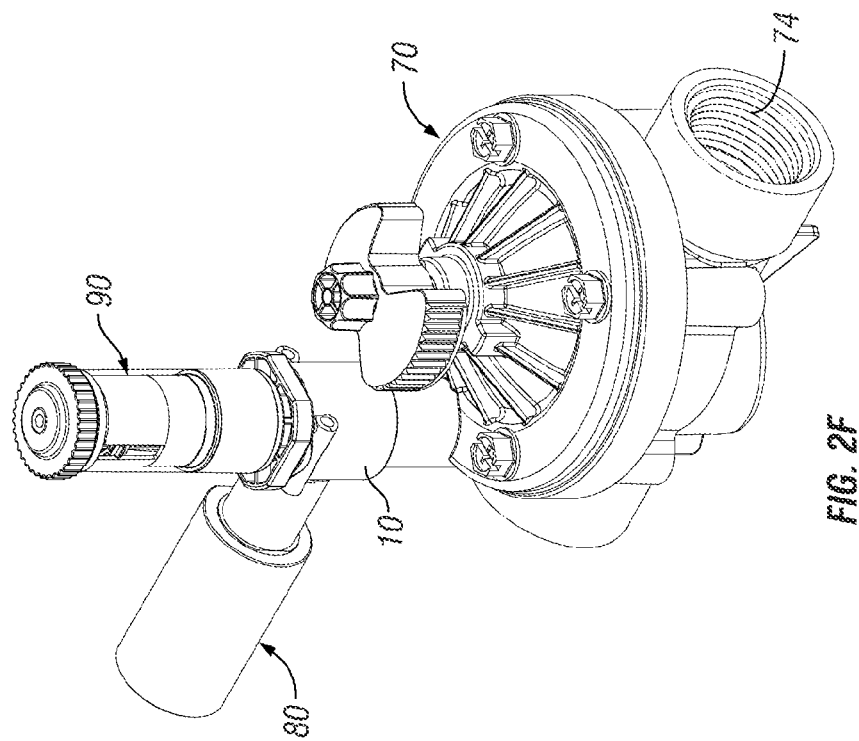
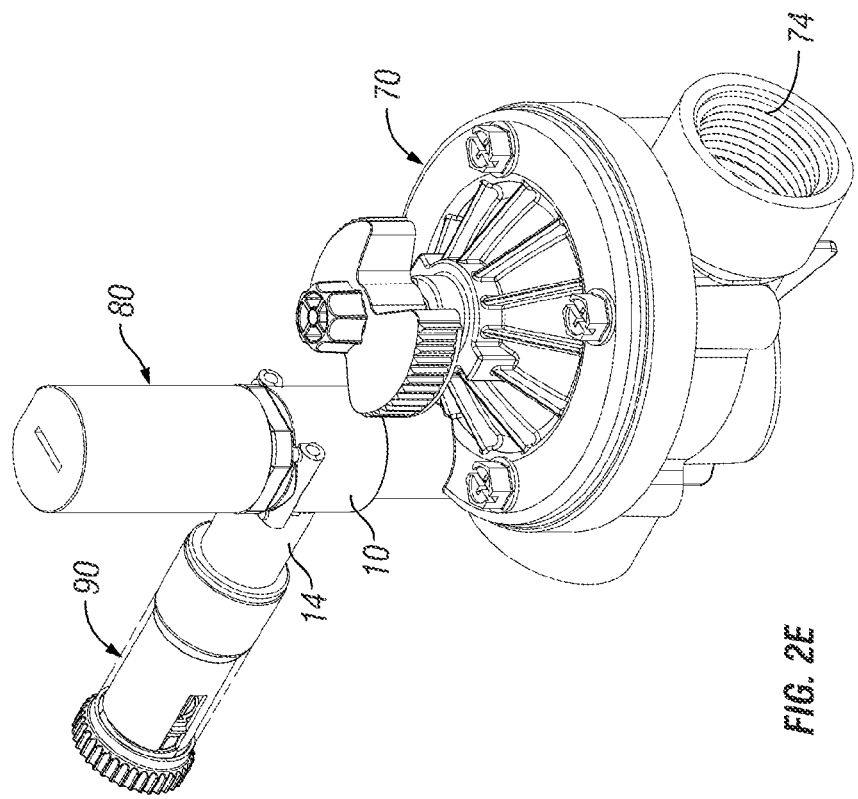

SWIVEL ADAPTER FOR AN IRRIGATION VALVE

FIELD OF THE INVENTION

The present invention relates to irrigation valves used in residential and commercial irrigation systems.

BACKGROUND OF THE INVENTION

Solenoid actuated valves are used in automatic irrigation systems for watering turf and/or landscaping. They control the supply of pressurized water to a plurality of sprinklers. An electronic irrigation controller is used to turn the valves ON and OFF in accordance with a watering program. In recent years water conservation has become increasingly important in terms of conserving precious environmental resources. Irrigation sprinklers are designed to work most efficiently over specified water pressure ranges. Often water is supplied at a pressure which is too high, causing large amounts of water to be wasted. Therefore pressure regulators are often installed in irrigation systems to alleviate this problem. It has been conventional to mount a pressure regulator on the valve body using an adapter. Typically the adapter is screwed into the valve body where the solenoid is normally screwed. The pressure regulator is then screwed into one port of the adapter and the solenoid is screwed into a second port of the adapter.

SUMMARY OF THE INVENTION

In accordance with the present invention a swivel fitting is specifically configured for mounting a pressure regulator and a solenoid to a valve having a female threaded solenoid mounting port. The swivel fitting includes a generally cylindrical upper body having a first female threaded bore for having a male threaded neck of either a solenoid or a pressure regulator screwed into the first bore. A generally cylindrical lower body is mated to the upper body and has a male threaded segment for screwing into the female threaded solenoid mounting port of a valve. A swivel body surrounds and encloses the upper body and the lower body and has an extension with a second female threaded bore for having the male threaded neck of either the solenoid or the pressure regulator screwed into the same. The swivel body is freely rotatable relative to the cylindrical bodies. A pair of valve seats in the swivel fitting and communicating ports and chambers allow the solenoid to open and close flow through the valve and the pressure regulator to regulate flow through the valve when the solenoid and the pressure regulator are each screwed into one of the first and second bores.

The present invention also provides an assembly for use in an irrigation system that includes an irrigation valve with a solenoid and pressure regulator operatively coupled thereto via a swivel adapter. The irrigation valve has a mounting port that communicates with a chamber on one side of a flow control diaphragm that moves to control flow from an inlet port to an outlet port. The swivel adapter is coupled to the mounting port. The solenoid and the pressure regulator are both operatively coupled to the swivel adapter. The swivel adapter includes a valve seat for selective opening and closing by the solenoid to cause movement of the flow control diaphragm. The swivel adapter further includes a plurality of chambers for permitting the pressure regulator to control the pressure at the outlet port of the irrigation valve. The swivel adapter includes at least two bodies that are rotatable relative to each other so that the relative positions of the solenoid and the pressure regulator can be changed without affecting the ability of the solenoid to open and close the irrigation valve and the pressure regulator to control the pressure at the outlet port.

BRIEF DESCRIPTION OF THE DRAWINGS

FIG. 2A is a reduced isometric view of a conventional irrigation valve that has a solenoid and a pressure regulator operatively coupled thereto with the swivel adapter of FIG. 1.

FIG. 2B is a side elevation view of the irrigation valve of FIG. 2A taken from the side on which the outlet port opens.

FIG. 2E is a view similar to FIG. 2A with the pressure regulator swung to a different location as permitted by the swivel adapter.

FIG. 2F is a view similar to FIG. 2E illustrating the interchange of the mounting positions of the solenoid and the pressure regulator on the swivel adapter.

DETAILED DESCRIPTION

Figure 1:
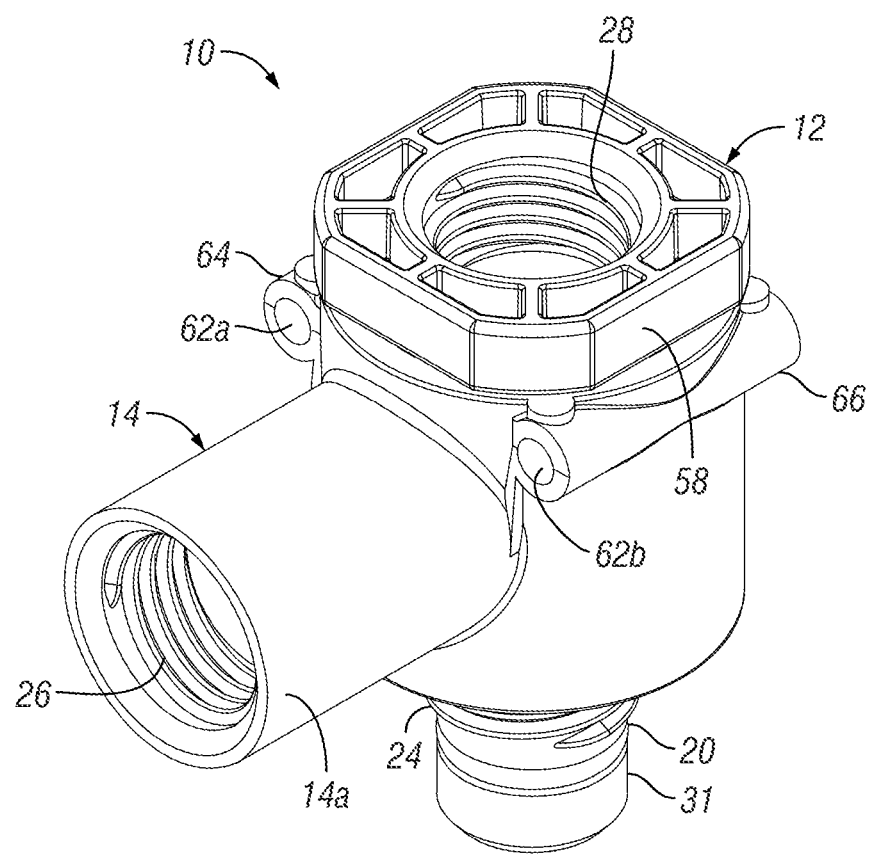
FIG. 1 is an enlarged isometric view of a swivel adapter in accordance with an embodiment of the present invention.

Referring to FIG. 1 a swivel adapter 10 includes a generally cylindrical upper body 12 and a mating generally cylindrical lower body 31 (FIG. 4) that are rotatably confined within a generally L-shaped outer swivel body 14 by a pair of retaining pins 62a and 62b (FIG. 1) pressed into a corresponding pair of hubs 64 and 66 formed on the swivel body 14. The upper body 12, the lower body 31 and the outer swivel 14 are preferably injection molded out of suitable plastic although they could be made of machined brass or other suitable metal.

Figure 2D:
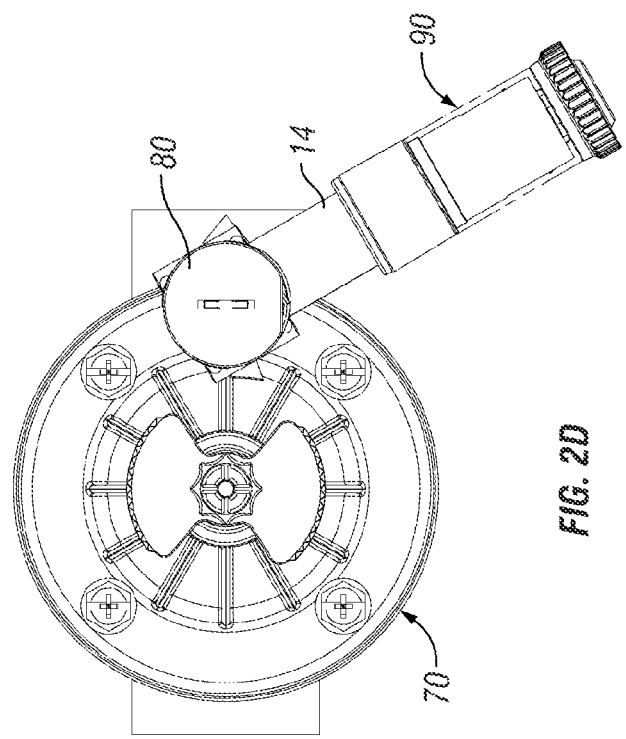
FIG. 2D is a top plan view of the irrigation valve of FIG. 2A.
Figure 2C:
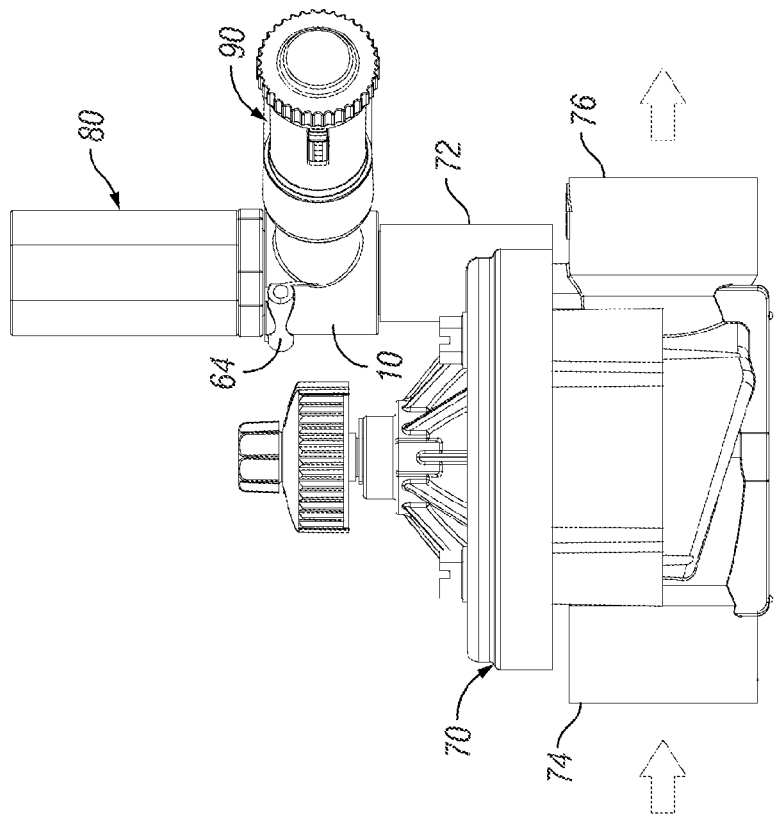
FIG. 2C is a view similar to FIG. 2B rotated ninety degrees in a counter-clockwise direction viewed from above.

Referring to FIGS. 2A-2F the swivel adapter 10 operatively couples a conventional solenoid 80 and an adjustable pressure regulator 90 to a solenoid actuated irrigation valve 70 to form an assembly that can function as a component of an irrigation system. Pressurized water is conveyed through a pipe (not illustrated) connected to an inlet port 74 of the valve 70, and exits the valve 70 via outlet port 76 when the valve 70 is opened by energizing the solenoid 80. The water exits the irrigation valve 70 at a lower regulated pressure that is determined by the manual setting of the adjustable pressure regulator 90. The large arrows in FIG. 2C illustrate the direction of flow of the main water flow path through the irrigation valve 70.

The irrigation valve 70 is a bonnet-style diaphragm valve such at that disclosed in U.S. Pat. Nos. 5,979,482 granted Nov. 9, 1999 or 5,996,608 granted Dec. 7, 1999, both assigned to Hunter Industries, Inc., the assignee of the subject application. The entire disclosures of the aforementioned '482 and '608 patents are hereby incorporated by reference. The solenoid 80 is connected to a dedicated field valve line and a common return line (not illustrated) that are connected to an irrigation controller (not illustrated). A low voltage electrical signal, such as twenty-four volts AC, is selectively sent to the solenoid 80 by the irrigation controller via the lines to energize the solenoid and open the irrigation valve 70. See U.S. Pat. No. 7,181,319 granted Feb. 20, 2007 and assigned to Hunter Industries, Inc. for an example of such an irrigation controller. The entire disclosure of the aforementioned '319 patent is hereby incorporated by reference.

Figure 3:
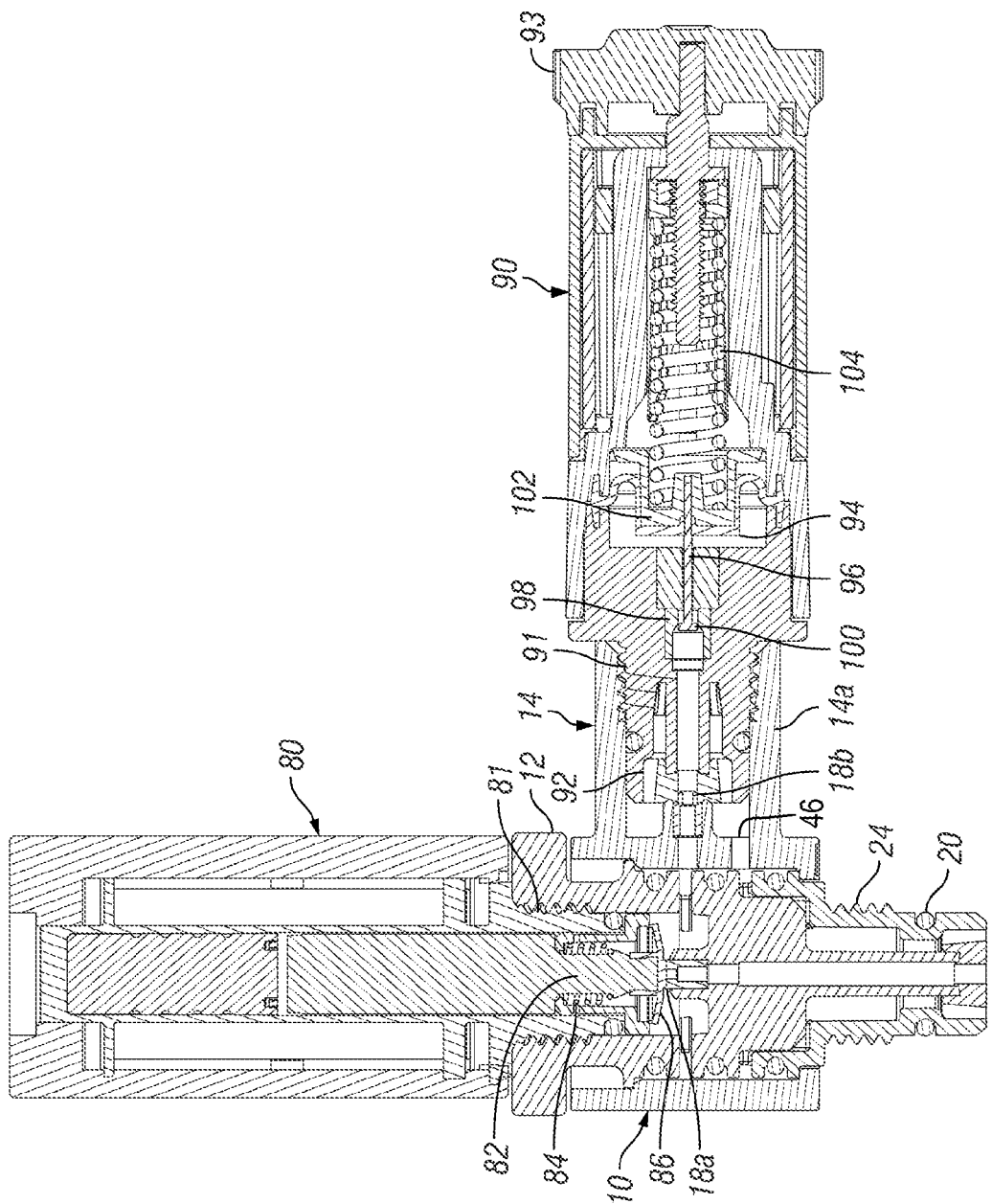
FIG. 3 is an enlarged cross-section view of the swivel adapter of FIG. 1 with the solenoid and the pressure regulator operatively coupled thereto as illustrated in FIGS. 2A-2D.

Referring to FIG. 3 a male threaded neck 81 of the solenoid 80 is screwed into a female threaded bore 28 (FIG. 1) in the upper body 12 of the swivel adapter 10. A male threaded neck 91 (FIG. 3) of the pressure regulator 90 is screwed into a female threaded bore 26 of a cylindrical extension 14a of the swivel body 14. The bores 26 and 28 extend at a ninety degree angle relative to each other so that the solenoid 80 and pressure regulator 90 extend at substantially a right angle relative to each other. The relative positions of solenoid 80 and the pressure regulator 90 can be interchanged, as illustrated in FIGS. 2B and 2F, so that the pressure regulator 90 is threaded into the upper body 12 and the solenoid 80 is threaded into the swivel body 14 without affecting the ability of the irrigation valve 70 to turn ON and OFF by energization and de-energization of the solenoid 80 and without affecting the ability of the pressure regulator 90 to control the pressure of water flowing through the irrigation valve 70.

Figure 4:
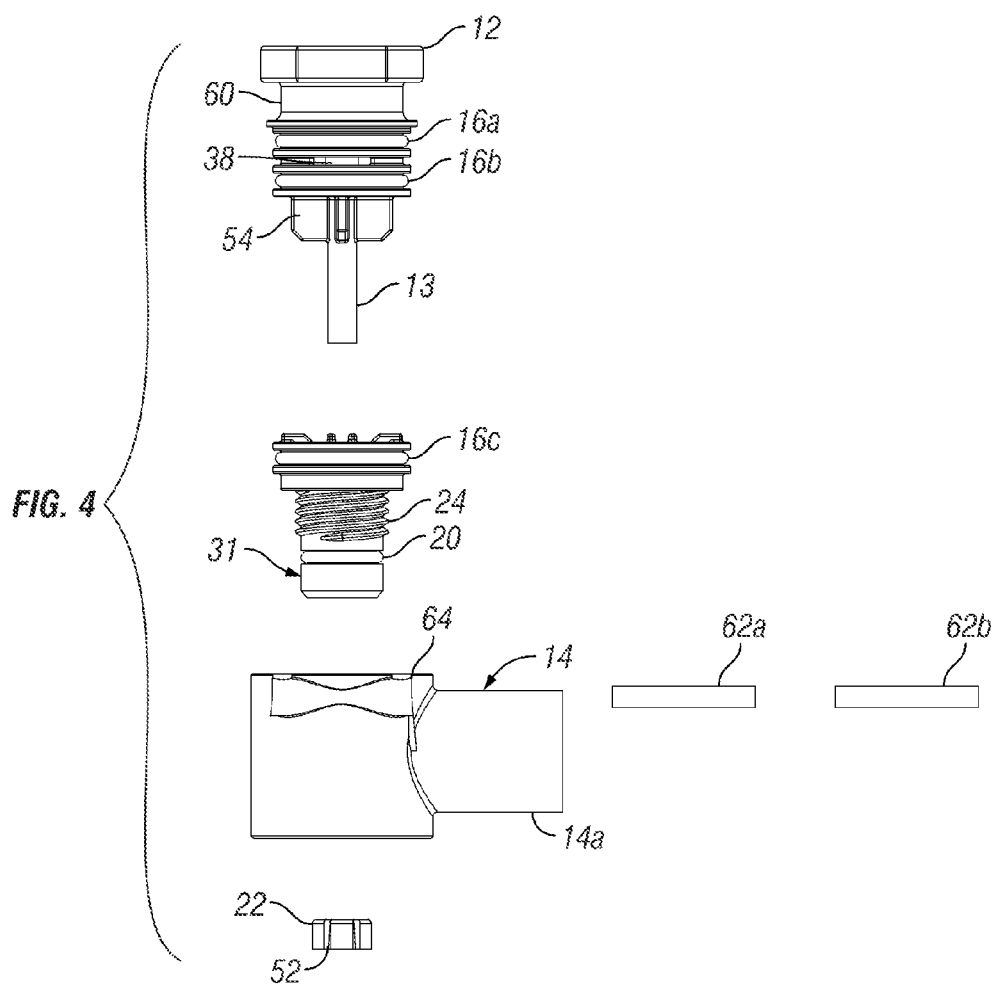
FIG. 4 is an exploded side elevation view of the swivel adapter of FIG. 1.
Figure 5:
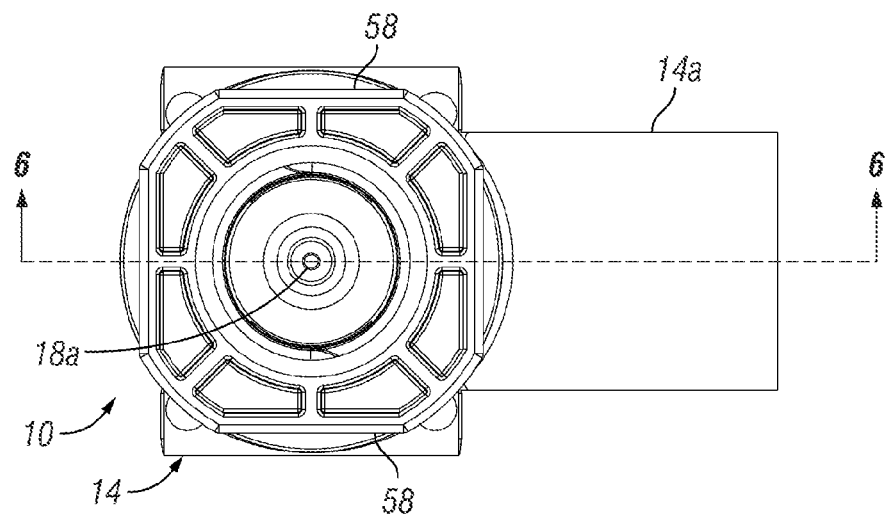
FIG. 5 is a top plan view of the swivel adapter of FIG. 1.
Figure 7:
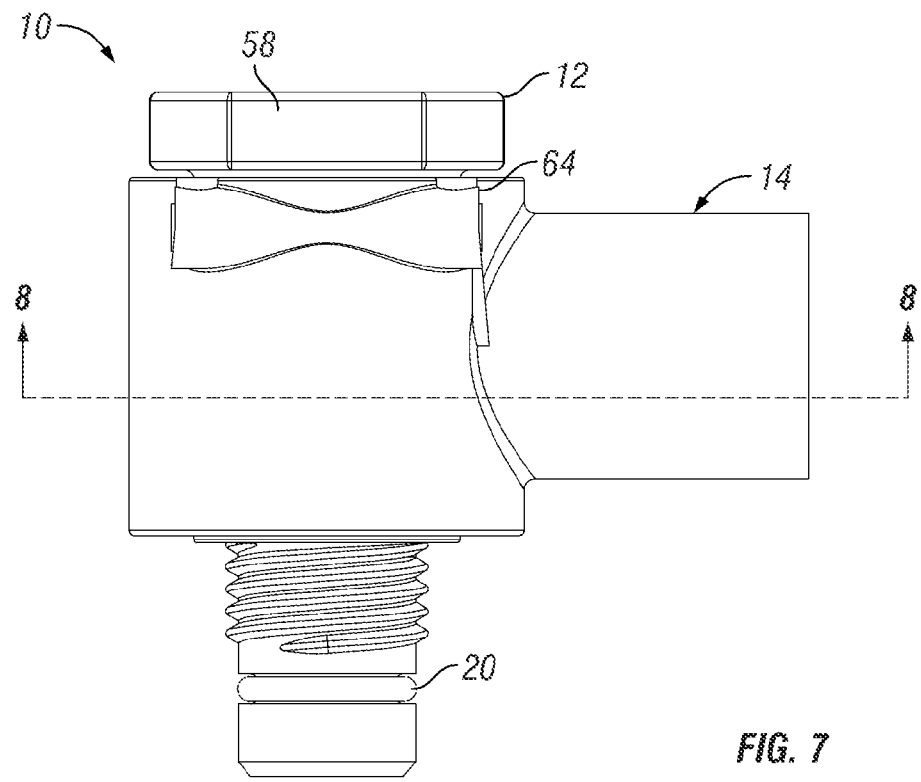
FIG. 7 is a side elevation view of the swivel adapter of FIG. 1.
Figure 8:
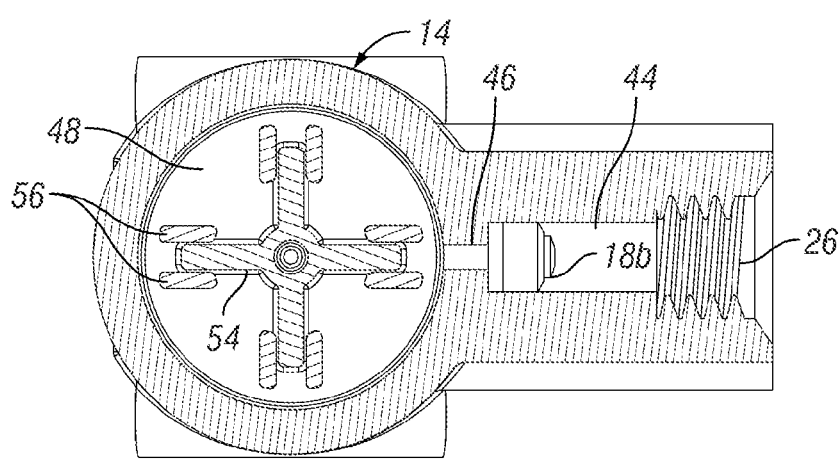
FIG. 8 is a horizontal sectional view of the swivel adapter taken along line 8-8 of FIG. 7.

Referring to FIG. 4, during assembly of the swivel adapter 10 a pair of O-rings 16a and 16b made of a suitable elastomeric polymer material are installed in axially spaced relationship around the upper body 12. Similarly a pair of O-rings 16c and 20 made of a similar elastomeric material are installed in axially spaced relationship around the lower body 31. The lower body 31 is installed in the swivel adapter 14. The upper body 12 is then installed in the lower body 31. The retaining pins 62a and 62b are then installed into the hubs 64 and 66 to retain the upper body 12 and lower body 31 in the swivel body 14 while allowing the swivel body 14 to freely rotate around the upper body 12 and lower body 31. Four lower body locking fins 54 (FIG. 8) arranged in a cross pattern interlock with mating pairs of retainer flanges 56 to rotationally lock the upper body 12 to the lower body 31. With the upper body 12 and the lower body 31 rotationally coupled, a wrench can be engaged with a plurality of wrench flat surfaces 58 (FIG. 7) formed on the upper end of the upper body 12 in order to tighten the swivel adapter 10 to the irrigation valve 70 by rotating a male threaded segment 24 of the lower body 31 into a mating female threaded solenoid mounting port (not illustrated) in a solenoid support neck 72 (FIG. 2C) of the irrigation valve 70.

Figure 6:
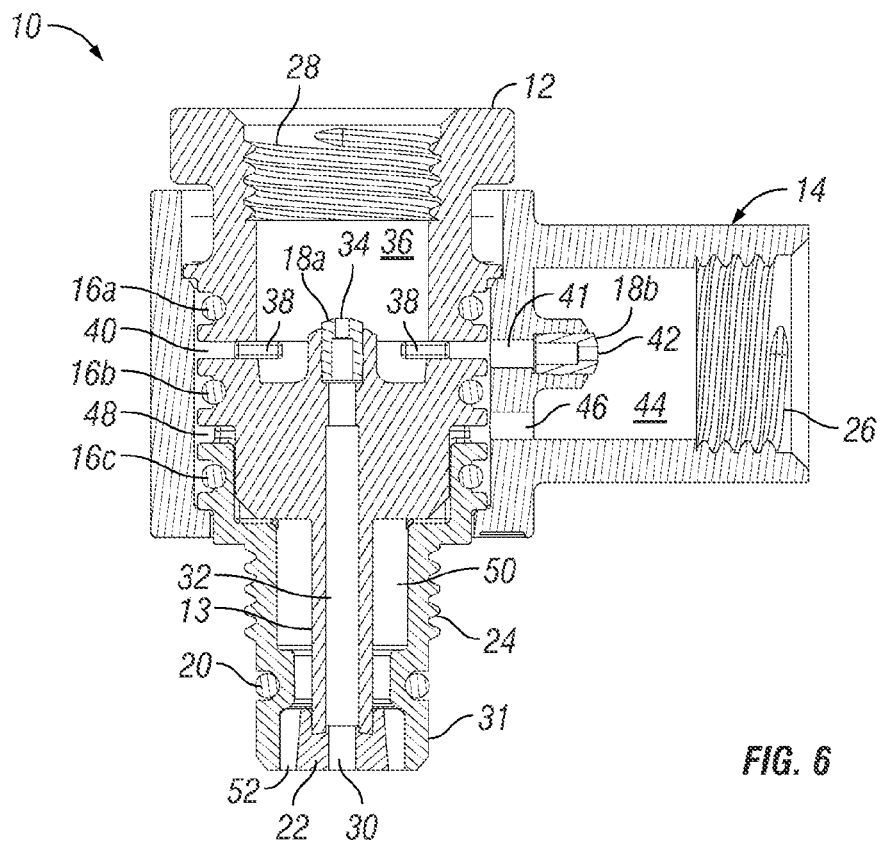
FIG. 6 is a vertical section view of the swivel adapter taken along line 6-6 of FIG. 5.

The O-ring 20 (FIG. 6) prevents pressurized water from leaking out of the solenoid support neck 72. Full line pressure water that has entered the irrigation valve 70 through the inlet port 74 is directed to a port 30 (FIG. 6) of an inlet seal 22. Line pressure water continues to flow through a port 32 in a co-axial stem 13 of the upper body 12 to a port 34 in a vertical valve seat 18a. When the solenoid 80 is de-energized, an elastomeric plunger cover 86 on the lower end of its plunger 82 (FIG. 3) is held in sealing engagement against the valve seat 18a by the spring force exerted by a coil spring 84 that surrounds the plunger 82. When an electrical current energizes the solenoid 80, the plunger cover 86 on the lower end of the plunger 82 is lifted off of the valve seat 18a and pressurized water fills a chamber 36 (FIG. 6) in the swivel adapter 10. This action turns ON the flow of water through the irrigation valve 70 by relieving pressurized water in a chamber behind a relatively large flow control diaphragm (not illustrated) in the irrigation valve 70. Pressurized water from chamber 36 in the swivel adapter 10 flows through a plurality of radially extending communication ports 38 in the upper body 12 (FIGS. 4 and 6) to fill a ring chamber 40 (FIG. 6) which is formed in the upper body 12. Water is confined to this area by the O-rings 16a and 16b. Pressurized water continues to flow from the ring chamber 40 through a swivel inlet port 41 and through a central port 42 of a horizontal valve seat 18b.

Referring again to FIG. 3, the male threaded neck 91 of the pressure regulator 90 screws into the female threaded bore 26 of the swivel body 14. The pressure regulator 90 includes a pressure regulator inlet seal 92. The pressure regulator 90 regulates the water pressure by modifying the flow through the swivel adapter 10. This in turn regulates the pressure on the back side of the flow control diaphragm in irrigation valve 70 which in turn regulates the pressure of the water exiting the irrigation valve 70 through outlet port 76. The regulated pressure of the pressure regulator 90 can be adjusted by manually twisting a control knob 93 on the outer end of the pressure regulator 90.

The chamber 44 (FIG. 6) in the swivel body 14 is in fluid communication with the outlet of the irrigation valve 70 such that the outlet pressure of the irrigation valve 70 is communicated to a diaphragm 94 (FIG. 3) of the pressure regulator 90. The chamber 44 (FIG. 6) communicates through a port 46 to a peripheral swivel pressure chamber 48 and then directly to a lower body pressure chamber 50 and a plurality of outer radial ports 52 in the inlet seal 22. The O-rings 16b and 16c (FIG. 4) prevent the water in the pressure chamber 48 (FIG. 6) from leaking into other areas of the swivel adapter 10. The pressurized water in chamber 44 pushes the diaphragm 94 (FIG. 3) and a piston 102 against the opposing force of a coil spring 104 in the pressure regulator 90. If the pressure is too high, relative to the force of the spring 104, a pin 96 moves with piston 102 to cause a metering pin head 100 to come in closer proximity to the walls of a metering port 98 as illustrated in FIG. 3. This reduces the flow of water from the back side of the flow control diaphragm (not illustrated) of the irrigation valve 70 that is flowing through seat 18b. The irrigation valve 70 begins to reduce output flow as the flow of water behind its flow control diaphragm is decreased and the pressure behind its flow control diaphragm increases. As the output flow of the irrigation valve 70 is reduced, the output water pressure also reduces. As the output pressure reduces, the pressure in chamber 44 also reduces which reduces the pressure force against the diaphragm 94 and the piston 102. As the pressure in chamber 44 reduces, the force of the spring 104 causes the piston 102 and the metering pin 96 to move the metering head 100 away from the metering port 98 to allow additional flow of water through the metering port 98. This allows the irrigation valve 70 to deliver more water though the outlet port 74 and increases the water pressure at the outlet port 74. The regulation of the pressure at the outlet port 74 of the irrigation valve 70 is accomplished by the forces of the pressurized water in the chamber 44 equalizing with the forces of the spring 104 (FIG. 3) which regulates the flow of water through the metering port 98 by moving the metering pin head 100 to a position that regulates the flow of water coming through a bleed port in the irrigation valve 70 such that the flow control diaphragm of irrigation valve 70 positions itself to regulate the flow, and thus the pressure of the water exiting port 74 of irrigation valve 70.

When the pressure regulator 90 and the solenoid 80 are interchanged to their alternate mounting positions, the irrigation valve 70 functions in the same manner as the water pressure in the chamber 44 (FIG. 6) is communicated to the chamber 36 via the port 42 in the valve seat 18b to the ring chamber 40 and through the communication ports 38. The plunger cover 86 engages the horizontal seat 18b in this configuration. When the solenoid 80 is energized, the pressure in the chamber 36 is substantially the same as the pressure in the chamber 44. The water pressure in the chamber 36 forces the diaphragm 94 and piston 102 against spring 104 to accomplish the regulating function. This does not adversely affect the functionality of the pressure regulator 90 or the solenoid 80. The interchange feature of the swivel adapter 10 allows for flexibility when installing the assembly at the irrigation site to best meet the space limitations and wiring requirements in the subterranean valve box.

The swivel adapter 10 provides substantially more flexibility in regard to mounting the pressure regulator 90 and the solenoid 80 on the top of the irrigation valve 70. As illustrated in FIGS. 2E and 2F the solenoid 80 may be mounted to either the top port or the side port of the swivel adapter 10 and the pressure regulator 90 may mounted to either the side port or the top port. The side port swivels around the axis of the top port and can be freely rotated in any direction. This allows an installer to mount the pressure regulator 90 and solenoid 80 in the best positions during installation of a valve in a subterranean valve box to accommodate wiring, and plumbing and to provide easier maintenance in the future. Alternate rotational positions for the pressure regulator 90 are illustrated in FIGS. 2D and 2E. The swivel adapter 10 places a central axis of the solenoid 80 or the pressure regulator 90 in vertical co-axial relationship with a central vertical axis of the female threaded mounting port formed in the solenoid support neck 72 of the irrigation valve 70. The solenoid 80 and the pressure regulator 90 extend at substantially a right angle relative to each other. Thus either the pressure regulator 91) is rotatable about the central axis of the solenoid 80 or visa, versa.

While an embodiment of the swivel adapter of the present invention has been described in detail, it should be apparent to those skilled in the art that the invention can be modified in arrangement and detail. The swivel fitting could be made with only one valve seat so that the positions of the solenoid and pressure regulators could not be swapped. The swivel fitting can also be used with other types of irrigation valves besides the illustrated bonnet-style irrigation valve, including piston type valves. See for example U.S. Pat. No. 7,303,147 granted Dec. 4, 2007, both assigned to Hunter Industries, Inc., the entire disclosures of which are hereby incorporated by reference. The swivel fitting can accept a fixed pressure regulator in addition to an adjustable pressure regulator. The swivel adapter, solenoid and/or the pressure regulator may utilize other attachment methods, such as bayonet, collet, or snap together type couplings instead of the threaded couplings. The upper and lower body components could be manufactured as a single unit. Therefore the protection afforded the present invention should only be limited in accordance with the scope of the following claims.

I claim:

1. A swivel fitting for mounting a pressure regulator and a solenoid to a valve having a female threaded solenoid mounting port, comprising:
   a generally cylindrical upper body having a first female threaded bore for having a male threaded neck of either a solenoid or a pressure regulator screwed into the first bore;
   a generally cylindrical lower body mated to the upper body and having a male threaded segment for screwing into the female threaded solenoid mounting port of a valve;
   a swivel body surrounding and enclosing the upper body and the lower body and having a second female threaded bore for having the male threaded neck of either the solenoid or the pressure regulator screwed into the same, the swivel body being freely rotatable relative to the cylindrical bodies; and
   a pair of valve seats in the swivel body and communicating ports and chambers for allowing the solenoid to open and close flow through the valve and the pressure regulator to regulate flow through the valve when the solenoid and the pressure regulator are each screwed into one of the first and second bores.

2. The swivel fitting of claim 1 wherein the upper body and the lower body have mating features that interlock.

3. The swivel fitting of claim 1 and further comprising at least one O-ring surrounding the upper body and providing a seal between the upper body and the swivel body.

4. The swivel fitting of claim 1 and further comprising at least one O-ring surrounding the lower body and providing a seal between the lower body and the swivel body.

5. The swivel fitting of claim 1 wherein the second female threaded bore is formed in an extension of the swivel body.

6. The swivel fitting of claim 1 and further comprising an inlet seal mounted in a lower end of the male threaded segment.

7. The swivel fitting of claim 6 wherein the inlet seal has a plurality of exhaust ports.

8. The swivel fitting of claim 1 wherein the upper body has a plurality of radially extending communication ports.

9. The swivel fitting of claim 1 wherein the upper body is formed with a stem.

10. The swivel fitting of claim 9 wherein the lower body includes a chamber surrounding the stem.

11. An assembly for use in an irrigation system, comprising:
    an irrigation valve having a mounting port that communicates with a chamber on one side of a flow control diaphragm that moves to control flow from an inlet port to an outlet port;
    a swivel adapter coupled to the mounting port;
    a solenoid coupled to the swivel adapter;
    a pressure regulator coupled to the swivel adapter;
    the swivel adapter including a valve seat for selective opening and closing by the solenoid to cause movement of the flow control diaphragm and a plurality of communicating ports for permitting the pressure regulator to control the pressure at the outlet port of the irrigation valve, the swivel adapter including at least two bodies that are rotatable relative to each other so that the relative positions of the solenoid and the pressure regulator can be changed without affecting the ability of the solenoid to open and close the irrigation valve and the pressure regulator to control the pressure at the outlet port; and
    wherein the swivel adapter includes a generally cylindrical upper body having a first female threaded bore for having a male threaded neck of either the solenoid or the pressure regulator screwed into the first bore, a generally cylindrical lower body mated to the upper body and having a male threaded segment for screwing into a female threaded bore in the mounting port of a valve, and a swivel body surrounding and enclosing the upper body and the lower body and having a second female threaded bore for having the male threaded neck of either the solenoid or the pressure regulator screwed into the same, the swivel body being freely rotatable relative to the cylindrical bodies.

12. The assembly of claim 11 wherein the solenoid and the pressure regulator extend at substantially a right angle relative to one another.

13. The assembly of claim 11 wherein the swivel adapter includes a second valve seat.

14. The assembly of claim 11 and further comprising an inlet seal mounted in a lower end of the male threaded segment.

15. The assembly of claim 14 wherein the inlet seal has a plurality of ports.

16. The assembly of claim 11 wherein the upper body has a plurality of radially extending communication ports.

17. The assembly of claim 11 wherein the upper body is formed with a stem.

18. The assembly of claim 17 wherein the lower body includes a chamber surrounding the stem.

19. A swivel fitting for mounting a pressure regulator and a solenoid to a valve having a female threaded solenoid mounting port, comprising:

a generally cylindrical upper body having a first female threaded bore for having a male threaded neck of a pressure regulator screwed into the first bore;

a generally cylindrical lower body mated to the upper body and having a male threaded segment for screwing into the female threaded solenoid mounting port of a valve;

a swivel body surrounding and enclosing the upper body and the lower body and having a second female threaded bore for having the male threaded neck of a solenoid screwed into the same, the swivel body being freely rotatable relative to the cylindrical bodies; and a valve seat in the swivel body and communicating ports and chambers formed in the swivel body for allowing the solenoid to open and close flow through the valve and the pressure regulator to regulate flow through the valve when the pressure regulator and the solenoid are each screwed into the first and second bores, respectively.

* * * * *